United States Patent [19]

Rust et al.

[11] Patent Number: 5,024,019
[45] Date of Patent: Jun. 18, 1991

[54] SPINNER BAIT LURE WITH RATTLE POD

[76] Inventors: Mark H. Rust, 2721 Frostwood, Shreveport, La. 71108; Brian J. Kramer, 1815 Lake St., Bossier City, La. 71112

[21] Appl. No.: 369,034

[22] Filed: Jun. 19, 1989

[51] Int. Cl.$^5$ .............................................. A01K 85/00
[52] U.S. Cl. .................................. 43/42.31; 43/42.11; 43/42.13
[58] Field of Search ................. 43/42.31, 42.39, 42.13, 43/42.11, 42.18

[56] References Cited

U.S. PATENT DOCUMENTS

| | | | |
|---|---|---|---|
| 2,501,428 | 3/1950 | Woodle | 43/42.31 |
| 2,549,354 | 4/1951 | Wilson | 43/42.31 |
| 4,619,068 | 10/1986 | Wotawa | 43/42.31 |
| 4,745,700 | 5/1988 | Davis | 43/42.39 |
| 4,793,089 | 12/1988 | Long | 43/42.31 |
| 4,823,500 | 4/1989 | Shindeldecker | 43/42.13 |
| 4,823,501 | 4/1989 | Standish | 43/42.31 |
| 4,930,247 | 6/1990 | Dubois | 43/42.31 |

Primary Examiner—Kurt Rowan
Attorney, Agent, or Firm—John M. Harrison

[57] ABSTRACT

A spinner bait lure having various rattle pod configurations for containing loose shot and producing a rattling noise when the lure is retrieved. In a first preferred embodiment, a rattle pod is mounted on the body segment of the wire harness extending between the lure body and the line eye and in a second preferred embodiment, various rattle pod configurations are secured to a spinner segment of the harness wire which projects from the line eye to the spinner. The rattle pod configurations include an oval rattle pod, offset rattle pod, elongated rattle pod, tear-drop rattle pod, diving rattle pod, which is fitted with diving planes, a pivoting rattle pod and a sliding rattle pod.

4 Claims, 1 Drawing Sheet

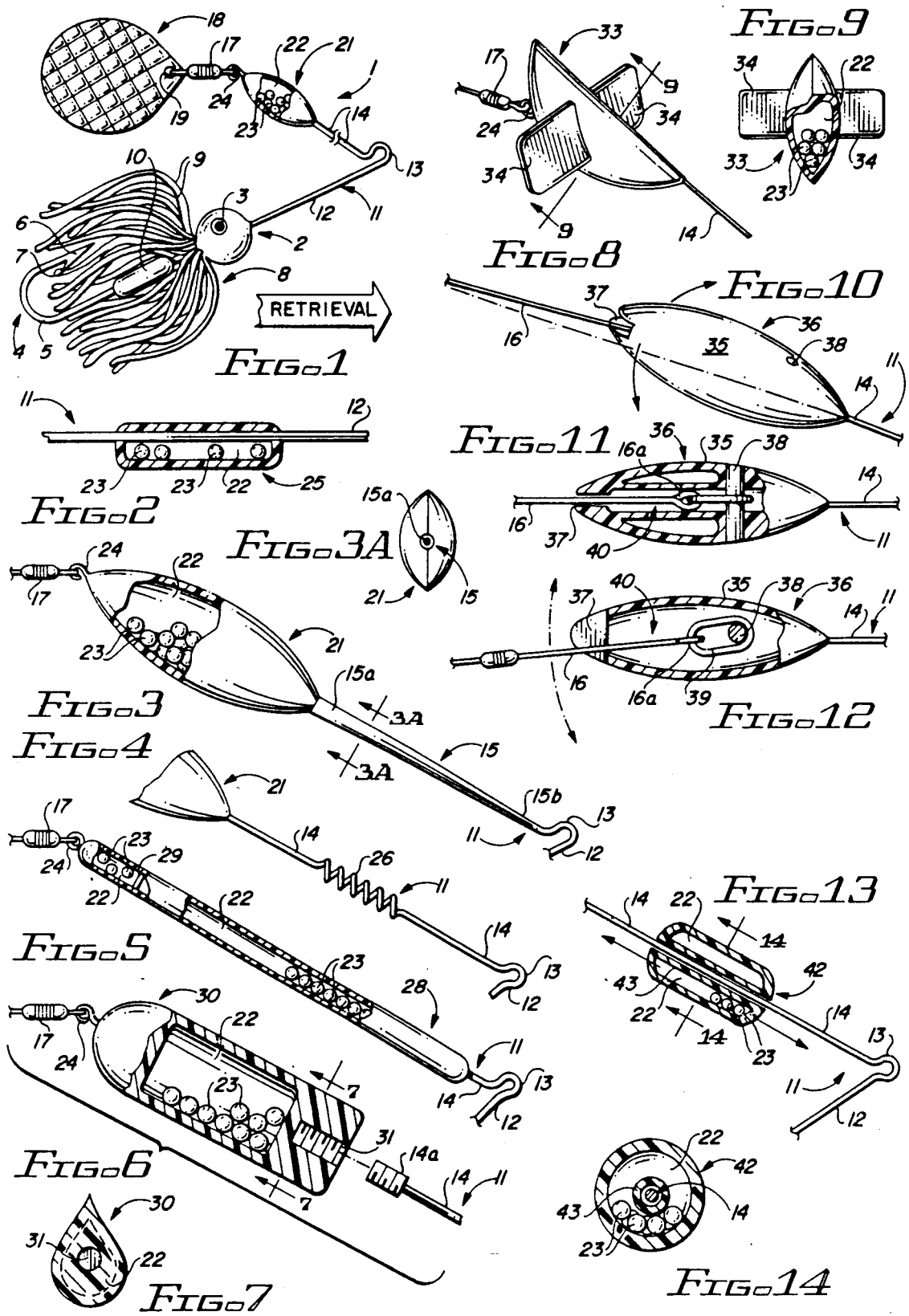

SPINNER BAIT LURE WITH RATTLE POD

BACKGROUND OF THE INVENTION

1. Field of the Invention

This invention relates to spinner bait lures and more particularly, to a spinner bait lure which is provided with rattle pods of various configuration, which rattle pods ar mounted on the body segment and spinner segment of the wire harness member of the lure. Each rattle pod includes multiple shot elements and movement of the shot inside the pod housing creates a rattling noise as the lure is retrieved through a water body. This rattling noise is accentuated by operation of a spinner or spinners which are mounted on the extending end of the wire harness and the lure is especially effective in murky water, where fish are attracted to a lure primarily by vibration, rather than by sight. In a first preferred embodiment, the rattle pods are mounted on the body segment, or that portion of the wire harness which extends from the body to a line eye which is fashioned in the wire harness and in a second preferred embodiment, the rattle pods are attached to or shaped integrally with the spinner segment of the wire harness, which extends between the line eye and the spinner. Various rattle pod configurations according to this invention include an oval rattle pod, an offset rattle pod, an elongated rattle pod, a tear-drop rattle pod, a diving rattle pod, which is fitted with diving planes to effect deep running of the spinner bait, a pivoting rattle pod and a sliding rattle pod, as hereinafter further described.

It has long been known that spinner bait lures are one of the most effective types of baits for catching fish, and particularly black bass. Spinner bait lures are generally characterized by a lead body portion which may be shaped into a desired configuration, a hook extending rearwardly of the body portion, a skirt mounted on the body portion for concealing the hook and lending a life-like appearance to the lure as the lure is retrieved, and an L-shaped wire harness extending from the body portion for mounting one or more spinners, attaching a fishing line and retrieving the lure. The spinner bait lure is characteristically used in shallow water and is retrieved at varying speeds at depths ranging from a few inches to several feet beneath the surface of the water, with the spinner or spinners rotating as the lure is pulled toward the fisherman. The flashing spinner or spinners attract fish from a wide area of water and the plastic or rubber-stranded skirt undulates and ripples as the lure is retrieved, thereby further enhancing the attractiveness of the lure to the fish. In other designs, the spinner or spinners may be tandem-mounted on a single wire or flexible member and the lure may or may not have a skirt attached thereto.

2. Description of the Prior Art

Various types of artificial fishing lures having spinners are well known to those skilled in the art. U.S. Pat. No. 2,835,068, dated May 20, 1958, to H. M. Latham, details "Artificial Fish Lures" which are characterized by solid head and body portions connected by an elongated member, with a treble hook located at the rear of the lure and a skirt secured to the treble hook for concealing the hook tips and barbs. A spinner mechanism is attached to the head of the body to facilitate rotation of the head about the elongated member and the longitudinal axis of the lure, to attract fish. U.S. Pat. No. 2,853,826, dated Sept. 30, 1958, to John Romeo, details an "Audible Fishing Lure". The audible fishing lure includes a simulated fish body having a tail assembly that is automatically rotated responsive to retrieval of the fishing lure through the water. The tail assembly is operative to actuate an audible signal which produces a continuous buzzing sound and vibration within the lure and within the immediate surrounding water area. U.S. Pat. No. 3,397,478, dated Aug. 20, 1968, to F. J. Lowes, Jr., details a "Fishing Lure" which includes a pair of spinners mounted in tandem on a wire portion, to the rear end of which wire portion is attached to hook and a skirt. As the lure is retrieved, the tandem-mounted spinners cause vibration of the lure body for attracting fish. U.S. Pat. No. 3,987,576, dated Oct. 26, 1976, to James W. Stradter, details a "Fishing Lure Provided With An Elongated Flexible Wire Shaft". The lure includes a connecting eye at one end and a hook located at the opposite end. A lead weight is disposed along the shaft, which weight is conically-shaped and is contained within a conically-shaped, plastic housing that forms a sound chamber. The shaft is provided with a clevis having a spinner attached thereto behind the lead weight and multiple ball-shaped bearings are provided on the shaft between the clevis and the covered lead weight. A weed guard is provided forward of the hook and the rubber skirt disguises the hook. The spinner, which is attached to the clevis, creates an uneven force around the flexible shaft when the lure is moved through the water, which force is transmitted along the shaft to the lead weight and the plastic cover, causing the lead weight to strike the interior of the cover for generating the sound. Another fishing lure is detailed in U.S. Pat. No. 4,745,700, dated May 24, 1988, to Jack Davis. The lure is designed to remain upright while sinking in the water or resting on the bottom of a water body and includes a body and a fishing hook provided with a buoyant spinner on one side of the lure body. The buoyant spinner has sufficient buoyancy to maintain the lure body and the hook in a predetermined upright attitude while the lure sinks in the water. The buoyant spinner is hollow and contains loose shot which produces a rattling noise as the buoyant spinner vibrates when the lure is pulled through the water. U.S. Pat. No. 4,747,228, dated May 31, 1988, to Johnnie Giovengo, Jr., details another fishing lure which is characterized by a cylindrically-shaped body having a hook embedded therein and a skirt extending therefrom and further including a capsule provided with steel balls which move in the capsule responsive to retrieval of the lure, to create a rattling noise.

It is an object of this invention to provide a new and improved spinner bait lure having a built-in rattle function for attracting fish.

Another object of the invention is to provide a spinner bait lure which is characterized by one or more rattle pods mounted on the wire harness for creating a rattling noise when the lure is retrieved.

Still another object of this invention is to provide a spinner bait lure provided with a lure body, a hook extending rearwardly of the lure body and a skirt mounted on the lure body or the hook for concealing the hook and an L-shaped wire harness projecting from the wire body, with a rattle pod mounted on the wire harness for containing multiple loose shot and creating a rattling noise and attracting fish when the lure is retrieved.

Yet another object of this invention is to provide a new and improved rattling spinner bait lure which includes a body segment and a wire harness fitted with an oval rattle pod having a pod cavity filled with shot for effecting a rattling noise when the lure is retrieved.

A further object of the invention is to provide a spinner bait lure having a lure body and an L-shaped wire harness which is fitted with an offset rattle pod mounted on the wire harness, which offset rattle pod is hollow and contains multiple loose shot for creating a rattling noise when the lure is retrieved.

Another object of the invention is to provide a spinner bait lure having a body of selected size and shape and an L-shaped wire harness extending therefrom for retrieving the lure and further including an elongated rattle pod shaped in the wire harness and containing multiple shot for effecting a rattling noise when the lure is retrieved.

A still further object of this invention is to provide a spinner bait lure provided with a shaped body portion and an L-shaped wire harness having one end extending from the body portion and the other end carrying a spinner and further including a hollow, tear-drop rattle pod therein, which tear-drop rattle pod is threadably attached to the spinner segment of the wire harness and contains multiple loose shot for creating a rattling noise when the lure is retrieved.

Yet another object of the invention is to provide a spinner bait lure having a head or body, an L-shaped wire harness extending from the head or body and a diving rattle pod mounted in the spinner segment of the wire harness and fitted with a pair of oppositely-disposed diving planes for causing the spinner bait to dive deeply into the water upon retrieval. The diving rattle pod is hollow and contains shot to create a rattling noise when the lure is retrieved.

Another object of the invention is to provide a spinner bait lure having a head and an L-shaped wire harness extending from the head, with a pivoting joint provided in the spinner segment of the wire harness for pivotally suspending an outer segment of the wire harness, to which outer segment is attached a rattle pod containing multiple shot, in order to create a rattling noise responsive to pivotal movement of the pivoting outer segment during retrieval of the lure.

Yet another object of the invention is to provide a spinner bait lure provided with a body portion, an L-shaped wire harness having one end attached to the body portion and a spinner rotatably mounted on the opposite end of the wire harness and further including a sliding rattle pod mounted on the wire harness, which sliding rattle pod is characterized by a hollow interior loaded with shot to create a rattling noise as the sliding rattle pod slides along the wire harness responsive to retrieval of the lure.

SUMMARY OF THE INVENTION

A spinner bait lure characterized by a body portion having a hook extending rearwardly thereof and a skirt attached to the body portion or the hook for concealing the skirt, an L-shaped wire harness having one end projecting from the body portion and fitted with a spinner at the opposite end, with a line eye provided intermediate the ends of the harness for attaching a line and retrieving the lure, and at least one rattle pod attached to the wire harness, the rattle pod(s) having a hollow interior and provided with loose shot therein for creating a rattling noise when the lure is retrieved.

BRIEF DESCRIPTION OF THE DRAWING

The invention will be better understood by reference to the accompanying drawing, wherein:

FIG. 1 is a perspective view of a preferred embodiment of the spinner bait lure fitted with an oval rattle pod according to this invention;

FIG. 2 is a sectional view of an offset rattle pod attached to the wire harness of the spinner bait lure illustrated in FIG. 1;

FIG. 3 is a perspective view, partially in section, of an oval rattle pod mounted on a tapered spinner segment of the wire harness illustrated in FIG. 1;

FIG. 3A is a sectional view taken along line 3A—3A of the tapered spinner segment illustrated in FIG. 3;

FIG. 4 is a perspective view, partially in section, of a spring segment provided in the spinner segment of the wire harness element of the spinner bait lure illustrated in FIG. 1;

FIG. 5 is a perspective view, partially in section, of an elongated pod embodiment of the spinner bait lure illustrated in FIG. 1;

FIG. 6 is a perspective view, partially in section, of a tear-drop rattle pod embodiment of the spinner bait lure illustrated in FIG. 1;

FIG. 7 is a sectional view taken along line 7—7 of the tear-drop rattle pod illustrated in FIG. 6;

FIG. 8 is a perspective view, partially in section, of a diving rattle pod embodiment of the spinner bait lure illustrated in FIG. 1;

FIG. 9 is a sectional view taken along line 9—9 of the diving rattle pod illustrated in FIG. 8;

FIG. 10 is a perspective view, partially in section, of a pivoting joint provided in the wire harness of the spinner bait lure illustrated in FIG. 1, in order to accentuate movement of a rattle pod and further enhance the rattling noise effected by the spinner bait lure illustrated in FIG. 1;

FIG. 11 is a side sectional view of the pivoting joint illustrated in FIG. 10;

FIG. 12 is a top sectional view of the pivoting joint illustrated in FIG. 10;

FIG. 13 is a sectional view of a sliding rattle pod embodiment of the spinner bait lure illustrated in FIG. 1; and FIG. 14 is a sectional view taken along line 14—14 of the sliding rattle pod illustrated in FIG. 13.

DESCRIPTION OF THE PREFERRED EMBODIMENTS

Referring initially to FIG. 1 of the drawing, the spinner bait lure with rattle pod of this invention is generally illustrated by reference numeral 1. The spinner bait lure 1 is characterized by lure body 2, which is typically molded of lead, painted and includes a simulated eye 3. A hook 4 extends rearwardly from the lure body 2 and is characterized by a curved hook shank 5, which terminates in a hook tip 6 and a hook barb 7, in conventional fashion. The skirt core 10 of a skirt 8 is removably secured to the lure body 2 and the skirt 8 is further characterized by multiple skirt streamers 9 which are typically constructed of rubber or plastic, in order to impart an undulating, pulsating and rippling effect when the spinner bait lure 1 is retrieved through the water. One end of an L-shaped wire harness 11 is embedded in the lure body 2 and extends outwardly of the lure body 2 to define a body segment 12, which body segment 12 terminates at a line eye 13, shaped in the wire harness 11 for attachment of a fishing line (not illustrated) and retrieval of the lure in the direction of the arrow. The wire harness 11 projects from the line eye 13 in angular relationship with respect to the body segment 12, to define a spinner segment 14 of selected length. An oval rattle pod 21 is secured to the end of the spinner segment 14 and is characterized by a pod cavity 22, fitted with multiple, spherical loose shot 23, in order to impart a rattling noise to the lure as the lure is retrieved through the water. A pod eye 24 projects from the opposite end of the oval rattle pod 21 from the spinner segment 14 and a spinner swivel 17 is secured to the pod eye 24 and extends through the spinner opening 19 of a spinner 18, in order to rotatably attach the spinner 18 to the oval rattle pod 21. Accordingly, it will be appreciated that when a fishing line (not illustrated) is tied to the line eye 13 and the spinner bait lure 1 is cast and retrieved through the water in conventional fashion, the spinner 18 rotates or oscillates on the spinner swivel 17 and causes the oval rattle pod 21 to vibrate, which action causes the shot 23 to rattle in the pod cavity 22 of the oval rattle pod 21 and further attract fish. Accordingly, in addition to the normal flashing and vibrating attraction presented by the rotating spinner 18 and the undulating, pulsating and rippling skirt streamers 9 in the spinner bait lure 1, the shot 23 produce a rattling noise as the lure is retrieved in the direction of the arrow.

Referring now to FIGS. 1 and 2 of the drawing, in another preferred embodiment of the invention a offset rattle pod 25 is secured to the body segment 12 of the wire harness 11 and includes a pod cavity 22, filled with multiple shot 23. As illustrated in FIG. 2, in a most preferred embodiment of the invention the body segment 12 of the wire harness 11 extends through the offset rattle pod 25. However, it will be understood by those skilled in the art that the offset rattle pod 25 can be inserted between discreet segments of the body segment 12 by welding, brazing or other techniques known to those skilled in the art.

Referring now to FIGS. 1, 3 and 3A of the drawing, in still another preferred embodiment of the invention the oval rattle pod 21 illustrated in FIG. 1 is attached to a tapered spinner segment 15, which defines that portion of the wire harness 11 located between the oval rattle pod 21 and the line eye 13, and replaces the body segment 12, illustrated in FIG. 1. In a most preferred embodiment, the tapered spinner segment 15 is characterized by a wide end 15a at the point of attachment to the oval rattle pod 21 and a narrow end 15b, at the line eye 13. In all other respects, the oval rattle pod 21 is configured as illustrated in FIGS. 1 and 3A and includes multiple loose shot 23 located in the pod cavity 22 thereof. A pod eye 24 extends from the opposite end of the oval rattle pod 21 for attachment to the spinner swivel 17, as further illustrated in FIGS. 1 and 3. It will be appreciated by those skilled in the art that the taper of the tapered spinner segment 15 creates a lever effect when the spinner 18 is rotating about the pod eye 24 during retrieval of the spinner bait lure 1, since the point of maximum bend in the tapered spinner segment 15 is at the narrow end 15b, which lies adjacent to the line eye 13. Accordingly, oscillation and vibration of the oval rattle pod 21 is more pronounced responsive to rotation of the spinner 18, than the oscillation or vibration of the spinner 18 in the oval rattle pod 21 configuration illustrated in FIG. 1. This effect produces a different sound from rattling of the shot 23 in the pod cavity 22 of the oval rattle pod 21 illustrated in FIG. 3 from the sound generated in the spinner bait lure 1 illustrated in FIG. 1.

Referring now to FIGS. 1 and 4 of the drawing, in yet another preferred embodiment of the invention a spring segment 26 is provided in the spinner segment 14 of the wire harness 11, in order to further enhance vibration of the oval rattle pod 21 and the spinner bait 21 illustrated in FIG. 1. It is understood that the spring segment 26 can be of any desired length, depending upon the degree of oscillation and vibration which is desired in the oval rattle pod 21 as the spinner bait lure 1 is retrieved. The degree of oscillation and vibration of the oval rattle pod 21 and therefore, the intensity of noise created by the shot 23 in the pod cavity 22, can also be controlled by the speed of retrieval of the spinner bait lure 1, which speed of retrieval causes a desired degree of extension and compression in the coils of the spring segment 26.

Referring now to FIGS. 1 and 5 of the drawing, in still another preferred embodiment of the invention an elongated rattle pod 28 is provided in the spinner segment 14 of the wire harness 11 and two pod cavities 22 are located in the elongated rattle pod 28 and are separated by a partition 29. Multiple shot 23 are located in each pod cavity 22 and in a most preferred embodiment of the invention the diameter of the spherical shot 23 located in the pod cavity 22 which is closest to the line eye 13 is slightly smaller than the diameter of the pod cavity 22, such that the shot 23 must lie in tandem therein, in order to create a rattling effect resulting from movement of the shot 23 along the length of the pod cavity 22 to the partition 29, responsive to retrieval of the spinner bait lure 1. Furthermore, the smaller pod cavity 22 located nearest the pod eye 24 contains smaller shot 23, for more random contact with the walls of the elongated rattle pod 28. It will be appreciated by those skilled in the art that either or both of the two rattle pod cavities 22 may be provided in the elongated rattle pod 28 and the elongated rattle pod 28 can be welded, brazed or otherwise secured to the spinner segment 14. A pod eye 24 is attached to the opposite end of the elongated rattle pod 28, in order to attach the spinner swivel 17 and the spinner 18 thereto.

Referring now to FIGS. 1, 6 and 7 of the drawing, a tear-drop rattle pod 30 is illustrated and is characterized by a pod cavity 22 and multiple loose shot 23 located therein. The tear-drop rattle pod 30 further includes internal threads 31 provided in the end thereof which lies opposite the pod eye 24, in order to receive corresponding external spinner segment threads 14a, secured to the extending end of the spinner segment 14 of the wire harness 11. Accordingly, it will be appreciated that the tear-drop rattle pod 30 can be threadably inserted on and removed from the spinner segment 14 by matching the spinner segment threads 14a and the internal threads 31 in the tear-drop rattle pod 30, as desired. As further illustrated in FIG. 6, a spinner swivel 17 is attached to the pod eye 24, in order to secure a spinner (not illustrated) to the tear-drop rattle pod 30. It will be further appreciated by those skilled in the art that any of the rattle pod configurations illustrated in the drawing and described herein may be provided with internal threads 31 for selective attachment to the extending end of the spinner segment 14 by means of the spinner segment threads 14a, as desired.

Referring now to FIGS. 1, 8 and 9 of the drawing in yet another preferred embodiment of the invention, a diving rattle pod 33 is secured to the end of the spinner segment 14 of the wire harness 11. Furthermore, in a most preferred embodiment of the invention the diving rattle pod 33 is characterized by an oval cross-section, as illustrated in FIG. 9, in order to facilitate minimum resistance to the water as the spinner bait lure 1 is retrieved. The diving rattle pod 33 further includes a pod cavity 22, containing multiple spherical shot 23. A pair of diving planes 34 ar attached to the diving rattle pod 33 in oppositely-disposed, angular relationship with respect to the plane of travel of the spinner bait lure 1, in order to force the spinner bait lure 1 downwardly and cause the spinner bait lure 1 to be retrieved at a greater depth in the water body during retrieval. A pod eye 24 is attached to the opposite end of the diving rattle pod 33 from the spinner segment 14, for attachment of the spinner swivel 17 and the spinner 18. Accordingly, it will be appreciated by those skilled in the art that the diving planes 34, located on the diving rattle pod 33, force the spinner bait lure 1 to travel deeply in the water body, while at the same time imparting additional vibration to the diving rattle pod 33, which vibration, in combination with the vibration created by the spinner 18, causes the shot 23 to rattle inside the pod cavity 22 and greatly enhance the noise level of the spinner bait lure 1 in the water. In a preferred aspect of this embodiment of the invention, the pod cavity 22 is sufficiently large to effect flotation of the spinner bait lure 1. In addition, the diving planes 34 may be hollow, or fitted with a buoyant material such as styrofoam, to help effect this buoyancy.

Referring now to FIGS. 1 and 10-12 of the drawing, in a still further preferred embodiment of the invention a pivoting joint 36 is provided in the spinner segment 14 of the wire harness 11, in order to further enhance the rattling effect of the oval rattle pod 21 in the spinner bait lure 1 illustrated in FIG. 1. The pivoting joint 36 is characterized by a tapered joint housing 35 having a joint slot 37 provided in one end thereof, which joint slot 37 communicates with a joint bore 40 therein. A joint pin 38 extends vertically and transversely through the joint housing 35 of the pivoting joint 36 and through the joint bore 40 therein, as illustrated in FIGS. 10-12. A pin link 39 engages the joint pin 38 in pivotal relationship and a pivoting spinner segment 16 is provided with a spinner wire loop 16a on the end thereof, for engaging the pin link 39, to facilitate pivoting of the pivoting spinner segment 16 from side-to-side in the joint bore 40 and through the joint slot 37, responsive to retrieval of the spinner bait lure 1. It will be appreciated by those skilled in the art that the oval rattle pod 21 is mounted on the extending end of the pivoting spinner segment 16 in the same manner as the spinner bait lure 1 illustrated in FIG. 1, such that retrieval of the spinner bait lure 1 causes the pivoting spinner segment 16 to pivot from side-to-side by operation of the pin link 39 on the joint pin 38, to impart greater vibration of the oval rattle pod 21 and therefore, more noise in the spinner bait lure 1, during retrieval.

Referring now to FIGS. 1, 13 and 14 of the drawing, in another preferred embodiment of the invention a sliding rattle pod 42 is mounted in sliding relationship on the spinner segment 14 of the wire harness 11. The sliding rattle pod 42 is characterized by a pod core 43, having a diameter larger than the spinner segment 14 to facilitate slidable movement of the sliding rattle pod 42 both toward and away from the line eye 13 and the wire harness 11. The sliding rattle pod 42 is further characterized by a concentric pod cavity 22, which receives multiple shot 23 therein, which shot 23 rattle inside the pod cavity 22 responsive to retrieval of the spinner bait lure 1 and vibration imparted to the spinner segment 14 of the wire harness 11 by operation of the spinner 18.

It will be appreciated by those skilled in the art that the spinner bait lure 1 may contain one or more spinners 18 of selected size, shape and material of construction. Furthermore, the oval rattle pod 21, offset rattle pod 25, elongated rattle pod 28, tear-drop rattle pod 30, diving rattle pod 33 and sliding rattle pod 42 can be constructed of any desired material, including glass, molded plastic materials known to those skilled in the art or a metal such as aluminum and the like, in non-exclusive particular, which are sufficiently strong and resonant to effect the desired rattling noise when the spinner bait lure 1 is retrieved. Furthermore, the shot 23 can be constructed of stainless steel, glass or plastic beads and like materials, in non-exclusive particular, depending upon the material of construction chosen for the pods and the intensity of sound required during retrieval of the spinner bait lure 1. Accordingly, while the preferred embodiments of the invention have been described above it will be recognized and understood that various modifications may be made therein and the appended claims are intended to cover all such modifications which may fall within the spirit and scope of the invention.

Having described my invention with the particularity set forth above, what is claimed is:

1. A spinner bait lure comprising a lure body; a hook projecting from said lure body; a skirt attached to said lure body in close proximity to said hook; an L-shaped wire harness having one end connected to said lure body and eye means provided in said wire harness for attaching a fishing line to said wire harness; at least one spinner rotatably carried by the opposite end of said wire harness; and an oval rattle pod rigidly carried by a spinner segment of said wire harness, said spinner segment located between said eye means and said opposite end of said wire harness, and tapered from a first diameter at said oval rattle pod to a smaller second diameter at said eye means, whereby retrieval of said spinner bait lure through a water body causes said spinner to rotate and said rattle pod to vibrate and emit a rattling noise.

2. A spinner bait lure comprising a shaped lure body; a hook having a shank portion embedded in said lure body, said shank portion projecting from said body in curved relationship to define a sharp hook tip; a skirt attached to said lure body in close proximity to said hook; a substantially rigid, L-shaped harness having one end carried by said lure body and the opposite end of said harness adapted to receive at least one spinner; a line eye provided in said harness intermediate said one end and said opposite end thereof, with that portion of said harness which is located between said lure body and said line eye defining a body segment of said harness; and that portion of said harness which extends from said line eye in angular relationship with respect to said body segment to a spinner end defining a spinner segment of said harness, said spinner segment tapered from a first diameter at said line eye to a larger second diameter at the spinner end of said spinner segment; a rattle pod rigidly attached to said spinner segment of said harness, whereby retrieval of said spinner bait lure through a water body causes said spinner to rotate and said rattle pod to vibrate and emit a rattling noise.

3. The spinner bait lure of claim 2 wherein said harness is constructed of wire and said rattle pod further comprises an oval pod cavity and at least one shot located in said oval pod cavity for emitting said rattling noise.

4. A spinner bait lure comprising a shaped lure body; a hook having a shank portion embedded in said lure body, said shank portion projecting from said lure body in curved relationship to define a sharp hook tip; a skirt attached to said lure body in close proximity to said hook; a substantially rigid, L-shaped harness having one end carried by said lure body and the opposite spinner end adapted to receive at least one spinner; a line eye provided in said harness intermediate said one end and said spinner end, with that portion of said harness which is located between said line eye and said lure body defining a body segment of said harness; and that portion of said harness which extends from said line eye in angular relationship with respect to said body segment to said spinner end defining a spinner segment, said spinner segment tapered from a first diameter at the spinner end thereof to a smaller second diameter at said line eye; and a rattle pod rigidly carried by said spinner segment of said harness, said rattle pod having a pod cavity and at least one shot located in said pod cavity for emitting said rattling noise, whereby retrieval of said spinner bait lure through a water body causes said spinner to rotate and said rattle pod to vibrate and emit a rattling noise.

* * * * *